(12) United States Patent
Shibuya

(10) Patent No.: US 11,310,446 B2
(45) Date of Patent: Apr. 19, 2022

(54) IMAGING DEVICE, IMAGE PROCESSING METHOD, AND PROGRAM

(71) Applicant: HITACHI KOKUSAI ELECTRIC INC., Tokyo (JP)

(72) Inventor: Takuhiro Shibuya, Tokyo (JP)

(73) Assignee: HITACHI KOKUSAI ELECTRIC INC., Tokyo (JP)

( * ) Notice: Subject to any disclaimer, the term of this patent is extended or adjusted under 35 U.S.C. 154(b) by 0 days.

(21) Appl. No.: 17/276,721

(22) PCT Filed: Aug. 23, 2019

(86) PCT No.: PCT/JP2019/033061
§ 371 (c)(1),
(2) Date: Mar. 16, 2021

(87) PCT Pub. No.: WO2020/059425
PCT Pub. Date: Mar. 26, 2020

(65) Prior Publication Data
US 2022/0038647 A1 Feb. 3, 2022

(30) Foreign Application Priority Data

Sep. 18, 2018 (JP) .............................. JP2018-174131

(51) Int. Cl.
*H04N 5/353* (2011.01)
*H04N 9/04* (2006.01)

(52) U.S. Cl.
CPC ....... *H04N 5/3532* (2013.01); *H04N 9/04517* (2018.08)

(58) Field of Classification Search
CPC .. H04N 5/2357; H04N 5/2353; H04N 5/2329; H04N 5/23287; H04N 5/23258;
(Continued)

(56) References Cited

U.S. PATENT DOCUMENTS

2015/0103209 A1* 4/2015 Elhachimi ............ H04N 5/2357
348/239
2015/0312464 A1* 10/2015 Peng .................... H04N 5/3532
348/226.1

FOREIGN PATENT DOCUMENTS

JP 2011-015222 A 1/2011
JP 2012-019429 A 1/2012
(Continued)

OTHER PUBLICATIONS

International Search Report cited in International Appln. No. JP2019/033061 dated Oct. 11, 2019.

*Primary Examiner* — Xi Wang
(74) *Attorney, Agent, or Firm* — Bacon & Thomas, PLLC

(57) ABSTRACT

An imaging device includes an optical system, a plurality of imaging elements, an imaging unit, a comparison unit, and a correction unit. The optical system is configured to disperse light of a subject image. The imaging elements are configured to capture subject images dispersed by the optical system using a rolling shutter method. The imaging unit is configured to shift a slit range, which is between a front curtain and a rear curtain of the rolling shutter method, by at least one line in a sub-scanning direction between the plurality of imaging elements. The comparison unit is configured to calculate a level difference in units of lines between image signals output by the plurality of imaging elements by comparing signal levels of the image signals, and the correction unit configured to correct influence of a flash band on the image signals on the basis of the level difference.

8 Claims, 11 Drawing Sheets

(58) Field of Classification Search
CPC ... H04N 5/23254; G06K 9/00228; G06K 9/40
USPC ............... 348/226.1, 241–251; 382/275, 274
See application file for complete search history.

(56) References Cited

FOREIGN PATENT DOCUMENTS

| | | |
|---|---|---|
| JP | 2013-165439 A | 8/2013 |
| JP | 2014-023035 A | 2/2014 |
| JP | 2017-224885 | 12/2017 |
| WO | WO/2010-119669 A1 | 10/2010 |
| WO | WO/2016-111239 A1 | 7/2016 |

* cited by examiner

IMAGING DEVICE, IMAGE PROCESSING METHOD, AND PROGRAM

TECHNICAL FIELD

The present invention relates to an imaging device, an image processing method, and a program.

BACKGROUND

Recently, with the performance improvement of complementary metal oxide semiconductor (CMOS) imaging elements, CMOS imaging elements are frequently being employed in imaging devices for business, such as broadcast cameras, most of which have conventionally employed charge coupled device (CCD) imaging elements.

The majority of CMOS imaging elements use a rolling shutter method in which charge accumulation (hereinafter, "exposure") is sequentially started for every scanning line (hereinafter, "line") in a main scanning direction and an image signal is sequentially read from each line to output a frame.

In the rolling shutter method, a time for starting exposure varies according to each line. Accordingly, when a flash illuminates a subject during a frame, a step difference in signal level that is a band-like interference (a flash band) occurs in an image signal of the read frame.

There have been proposed techniques for detecting the flash band.

For example, Patent Document 1 discloses a method of calculating signal levels of lines in one frame and determining that a flash band has occurred when there is a level change in one frame and the variation is a predetermined value or more.

Further, Patent Document 2 discloses a method of determining that a flash band has occurred when an area in which signal levels of pixels are increased is in a lower portion of a screen of a first frame and in an upper portion of a screen of a second frame and the signal levels are reduced in an area of the second frame which corresponds to the area of the first frame in which the signal levels are increased.

In addition, there have been proposed techniques for a flash band correction.

For example, Patent Document 1 discloses a method of removing a frame in which a flash band has occurred and replacing the frame with a previous frame in which no flash band has occurred or a method of generating an image by connecting images having lines of the same signal level to each other among a plurality of frames in which a flash band has occurred and replacing the frames with the generated image.

Further, Patent Document 2 discloses a method of removing a frame in which a flash band has occurred and replacing the frame with an image obtained by fusing preceding and following frames in which no flash band has occurred.

Further, Patent Document 3 discloses a method of removing a frame in which a flash band has occurred, generating an image of a screen the entire of which is supposititiously affected by a flash from an image of a frame before the flash band has occurred, and replacing the frame with the generated image.

RELATED ARTS

Patent Document 1: Japanese Patent Application Publication No. 2015-126425
Patent Document 2: Japanese Patent Application Publication No. 2007-306225
Patent Document 3: Japanese Patent Application Publication No. 2014-187673

SUMMARY

However, a method of detecting a flash band from a change in signal level between lines in one frame has a problem in that when a subject of which signal levels are clearly distinguished in an up-down direction is imaged, the subject is misdetected as a flash band.

Further, in many press conferences and the like in which numerous interviewers gather, many flashes are continuously emitted at a scene particularly attracting attention (a scene in which an interviewee poses or lowers his or her head). In this case, flash bands continuously occur over several frames, and thus it is difficult to accurately detect a flash band with the method of detecting a flash band by comparing signal levels of frames.

Further, when a flash band continuously occurs over some frames, a correction method of replacing a frame may result in a halt of video over some frames.

Moreover, when a plurality of flashes are emitted all at once in the same frame, a plurality of flash bands occur at different signal levels. Further, when a flash lighting time lengthens, a flash band occurs in which a signal level is gradually changed over tens of lines to hundreds of lines. In such a case, it is difficult to accurately detect and correct a gradual change in signal level caused by a flash band.

Consequently, the present invention is directed to providing a technique for appropriately detecting and correcting a flash band.

In accordance with an aspect of the present invention, there is provided an imaging device including: an optical system configured to disperse light of a subject image; a plurality of imaging elements configured to capture subject images dispersed by the optical system using a rolling shutter method; an imaging unit configured to shift a slit range, which is between a front curtain and a rear curtain of the rolling shutter method, by at least one line in a sub-scanning direction between the plurality of imaging elements; a comparison unit configured to calculate a level difference in units of lines between image signals output by the plurality of imaging elements by comparing signal levels of the image signals; and a correction unit configured to correct influence of a flash band on the image signals on the basis of the level difference.

Effect of the Invention

In accordance with the present invention, it is possible to appropriately detect and correct a flash band.

Objects, configurations, and effects other than those described above will become apparent from the following description of embodiments.

DETAILED DESCRIPTION

Hereinafter, embodiments of the present invention will be described with reference to the accompanying drawings.

First Embodiment

<Description of Configuration of First Embodiment>

Figure 1:
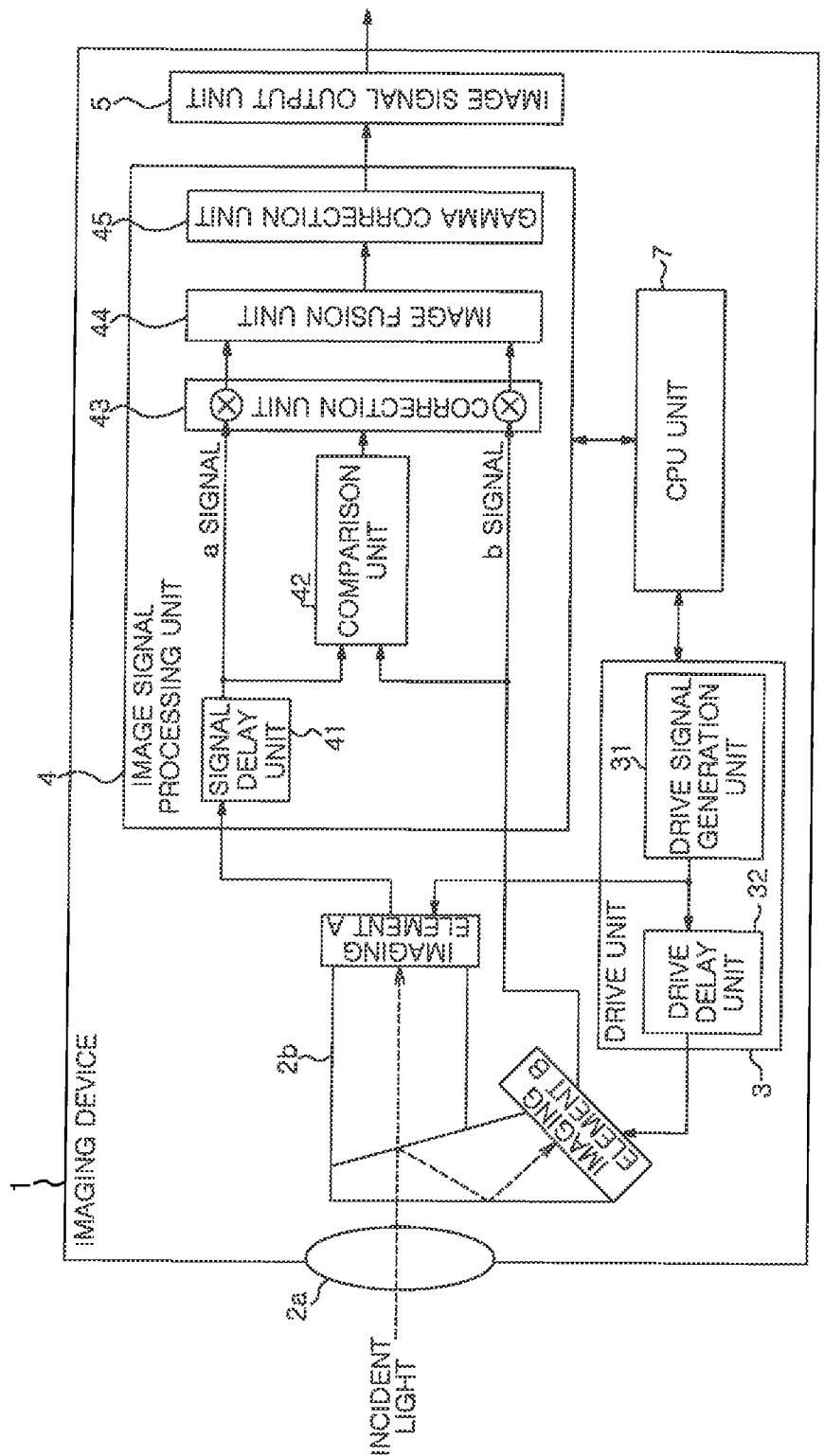
FIG. 1 is a block diagram showing an example of a configuration of a first embodiment.

FIG. 1 is a block diagram showing an example of a configuration of a first embodiment.

In FIG. 1, an imaging device 1 includes an optical system including a lens 2a and a dispersion prism 2b, an imaging element A, an imaging element B, a drive unit 3, an image signal processing unit 4, an image signal output unit 5, and a central processing unit (CPU) unit 7.

The lens 2a forms a subject image with incident light from a subject. The dispersion prism 2b disperses image-forming light of the subject image.

The imaging elements A and B are black-and-white or color mosaic filter imaging elements with the same specification. Imaging areas of the imaging elements A and B are disposed at the same pixel position at which each subject image dispersed by the dispersion prism 2b is received. Further, charge accumulation and reading are performed in units of lines (line by line) in a rolling shutter fashion based on the same specification.

The drive unit 3 includes a drive signal generation unit 31 and a drive delay unit 32. The drive signal generation unit 31 generates drive signals (e.g., a horizontal synchronization signal or a vertical synchronization signal) for the imaging elements A and B. The drive delay unit 32 delays the drive signal of the imaging element B for a predetermined time with respect to the drive signal of the imaging element A.

The image signal processing unit 4 includes a signal delay unit 41, a comparison unit 42, a correction unit 43, an image fusion unit 44, a gamma correction unit 45, and the like.

The signal delay unit 41 synchronizes an image phase of an image signal a output from the imaging element A with an image signal b output from the imaging element B, of which exposure is delayed, by delaying the image signal a by a predetermined time.

The comparison unit 42 calculates a level difference, such as a gain difference, by comparing signal levels of the image signals a and b, of which image phases are synchronized, in units of lines. Such a comparison may be performed on luminance components or according to color mosaic components (e.g., red, green, and blue (RGB) color components of the Bayer arrangement). Further, the average level of one line may be compared with that of another line, or levels of pixels in one line may be compared with each other.

The correction unit 43 sequentially holds the image signals a and b, of which image phases have been synchronized, in an internal line memory. The correction unit 43 reduces influence of a flash band by correcting gains of the image signals a and b in units of lines according to rules, which will be described below, on the basis of the level difference calculated in units of lines by the comparison unit 42.

The image fusion unit 44 fuses the image signals a and b in which effects of a flash band are reduced into one image signal (a luminance signal, a chrominance signal or the like). When the imaging elements A and B are arranged with a pixel shift, a process of increasing a resolution is performed.

The gamma correction unit 45 performs various image signal processes, such as gain correction, gamma correction, knee correction, contour correction, and color correction, on the fused image signal.

The image signal output unit 5 converts an image signal output from the image signal processing unit 4 into a predetermined image signal format, such as a high definition serial digital interface (HD-SDI) signal and externally outputs the converted signal.

The CPU unit 7 controls the drive unit 3, the image signal processing unit 4, or the like.

Next, various operations of the first embodiment will be described in sequence.

<Description of Rolling Shutter Operation>

Figure 2:
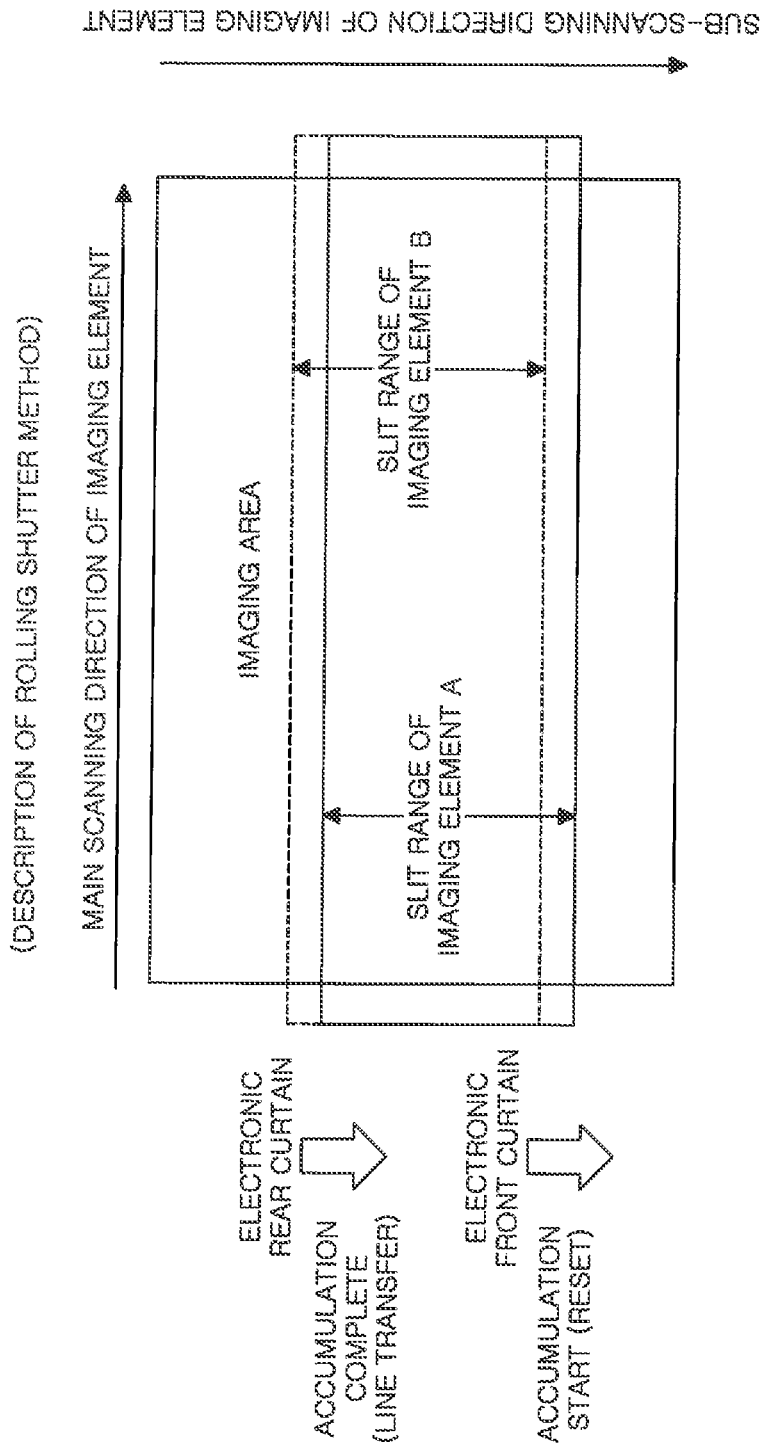
FIG. 2 is a diagram illustrating a rolling shutter operation of an imaging element.

FIG. 2 is a diagram illustrating a rolling shutter operation of the imaging elements A and B.

In the diagram, an electronic front curtain is an operation of resetting a single line by discharging charge accumulated in the imaging areas of the imaging elements A and B by as much as the single line. As soon as the line is reset, the reset line starts accumulating charge.

Meanwhile, an electronic rear curtain is an operation of reading a voltage (image signal) of charge accumulated in the imaging elements A and B by as much as one line.

A pixel area disposed between the electronic front curtain and the electronic rear curtain is an area in which a charge is continuously accumulated (i.e., in exposure) and corresponds to a slit range between shutter curtains of the rolling shutter. Hereinafter, this is referred to as a "slit range."

The slit range moves in a sub-scanning direction at predetermined sub-scanning speed while maintaining a slit width (the number of lines) which is determined according to an exposure time (shutter speed) set by the imaging device 1.

As shown in FIG. 2, a slit range of the imaging element B is moved (scanned) while being delayed by at least one line (a shorter-direction width of one line) in the sub-scanning direction with respect to a slit range of the imaging element A.

The delay of the slit range is realized when the drive unit 3 delays a drive signal of the imaging element B for a predetermined time with respect to a drive signal of the imaging element A to alter exposure start timings of the imaging elements A and B. In this case, the predetermined time may be determined by the following equation: predetermined time for delaying exposure start=number of lines of shift width×one line period of image signal.

Hereinafter, to simplify description, a shift width of the slit range is set to one line, but as necessary, the shift width may be at least a plurality of, that is, n, lines (n times the shorter-direction width of one line).

In the rolling shutter operation, there is a difference of a predetermined time for delaying exposure start between an image captured by the imaging element A and an image captured by the imaging element B. For this reason, in the strict sense of the word, the two images are not images of a subject at the same instant. However, for example, in a full high definition (HD) imaging element (e.g., a frame rate of 60 Hz and progressive scanning of a total of 1125 lines), a one-line period of an image signal is an instant of about 15 microseconds. Unless imaging a very high-speed subject, the imaging element A and the imaging element B may be assumed to capture images of a subject at the same instant.

<Detection and Correction of Flash Band Occurring in Upper Portion and Lower Portion of Screen>

Subsequently, detection and correction of a flash band which occurs in an upper portion and a lower portion of a screen will be described with reference to FIGS. 3 to 5.

Figure 3:
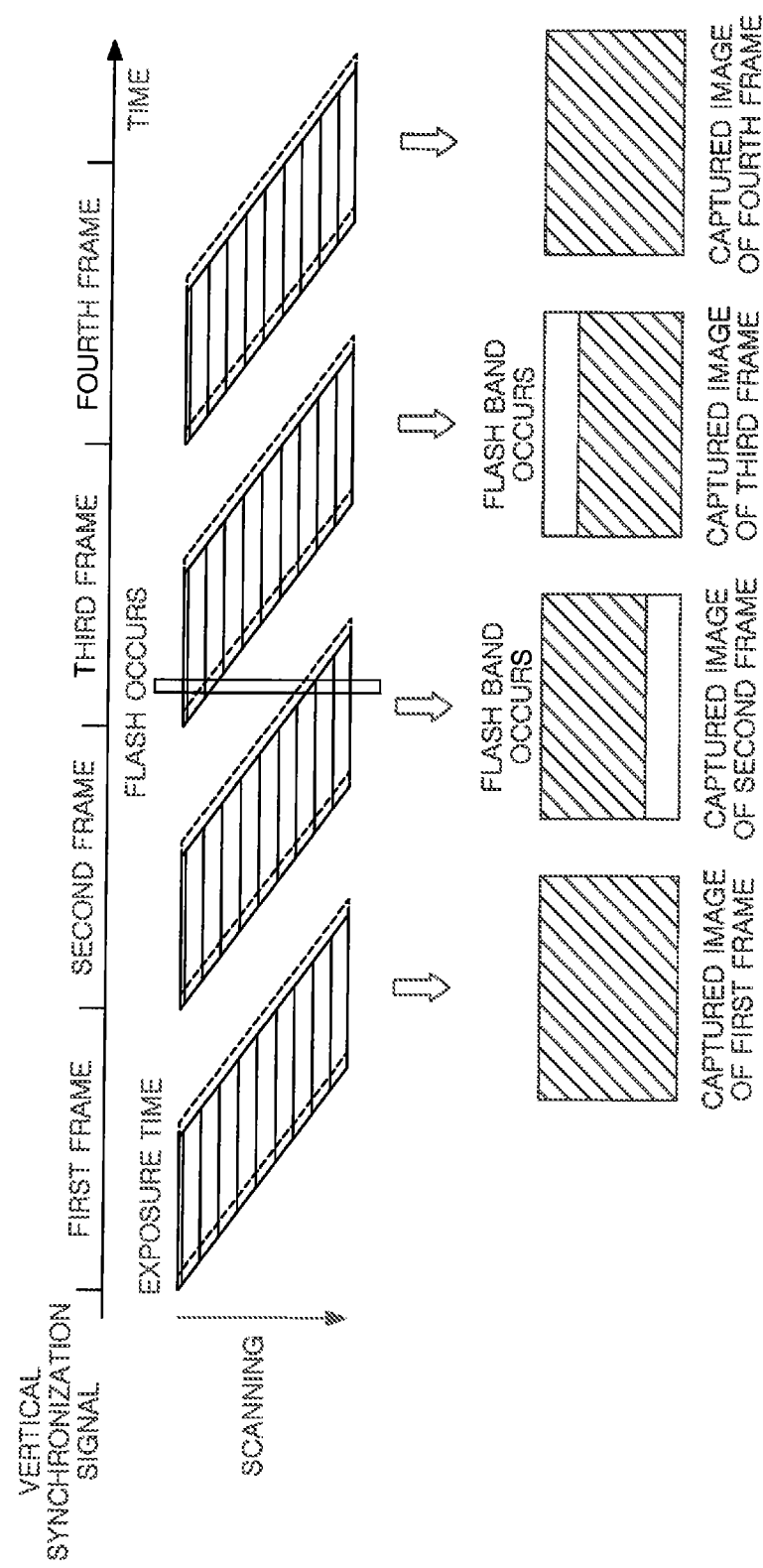
FIG. 3 is an explanatory diagram showing a rolling shutter operation along a time axis.

FIG. 3 is an explanatory diagram showing a rolling shutter operation along a time axis.

In FIG. 3, a flash of a third party is emitted to a subject at a timing at which a slit range extends from a lower portion of an imaging area of a second frame to an upper portion of an imaging area of a third frame. For this reason, in a captured video, a flash band occurs in a lower portion of a screen of the second frame and an upper portion of a screen of the third frame.

Figure 4:
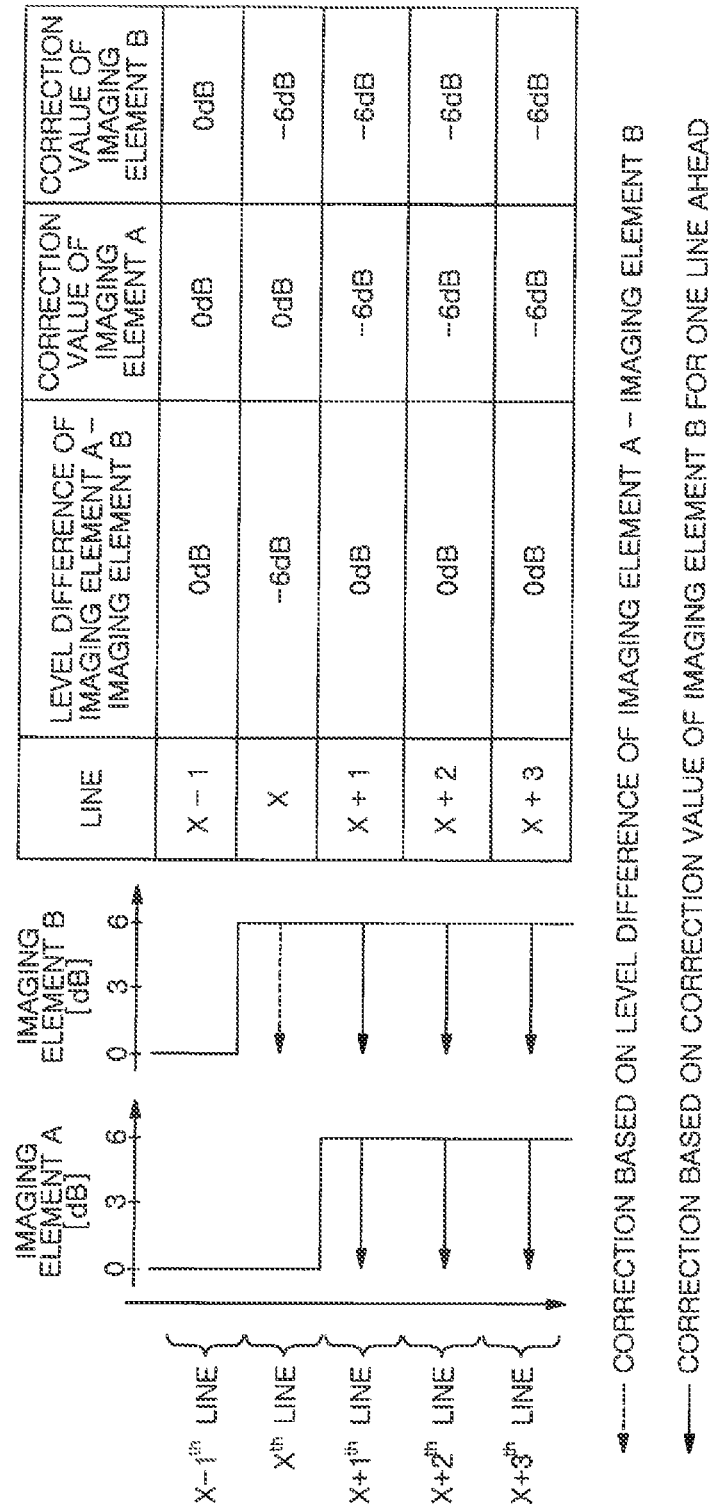
FIG. 4 is a diagram illustrating detection and correction of a flash band.

FIG. 4 is a diagram illustrating detection and correction of a flash band in the second frame.

In FIG. 4, a flash is emitted at a timing when the imaging element A has completed charge accumulation of an $X^{th}$ line and the imaging element B, of which exposure start is delayed by one line, is performing charge accumulation of an $X^{th}$ line.

In this case, the $X^{th}$ line of the imaging element A has completed charge accumulation, and thus no flash band occurs. Meanwhile, the $X^{th}$ line of the imaging element B is performing charge accumulation, and thus a flash band occurs.

The comparison unit 42 detects a level difference in the $X^{th}$ line by comparing image signals a and b, of which image phases are synchronized by the signal delay unit 41, and outputs the level difference to the correction unit 43.

The correction unit 43 determines that a line at which a signal level of the imaging element A starting exposure earlier is lower than a signal level of the imaging element B starting exposure later, such as the $X^{th}$ line shown in FIG. 4, is a start line of the flash band.

When a level difference is not significant (a level difference having an absolute value of less than a threshold value or the like), the correction unit 43 replaces the level difference with 0 dB to prevent a miscorrection.

The correction unit 43 addes the level difference value and a correction value gb of the imaging element B for one line ahead and determines that the result value is a correction value gb for a current line of the imaging element B.

For example, at the $X^{th}$ line shown in FIG. 4, a correction value gb of 0 dB for an $(X-1)^{th}$ line of the imaging element B is added to a level difference of −6 dB such that a correction value gb for the $X^{th}$ line becomes −6 dB.

At an $(X+1)^{th}$ line and subsequent lines of the imaging element B shown in FIG. 4, a correction value gb of −6 dB for one line ahead is added to a level difference of 0 dB such that the correction value gb is maintained at −6 dB.

The correction unit 43 corrects a level of the image signal b with the calculated correction value gb. Due to this level correction, the flash band which occurs in the image signal b of the imaging element B and in the lower portion of the screen is corrected to be darker and thus becomes unnoticeable.

Further, the correction unit 43 determines that the correction value gb for one line ahead is a correction value ga of the imaging element A. The correction unit 43 corrects a level of the image signal a with the correction value ga. Due to this level correction, the flash band which occurs to be shifted by one line in the image signal a of the imaging element A and in the lower portion of the screen is corrected to be darker and thus becomes unnoticeable.

Figure 5:
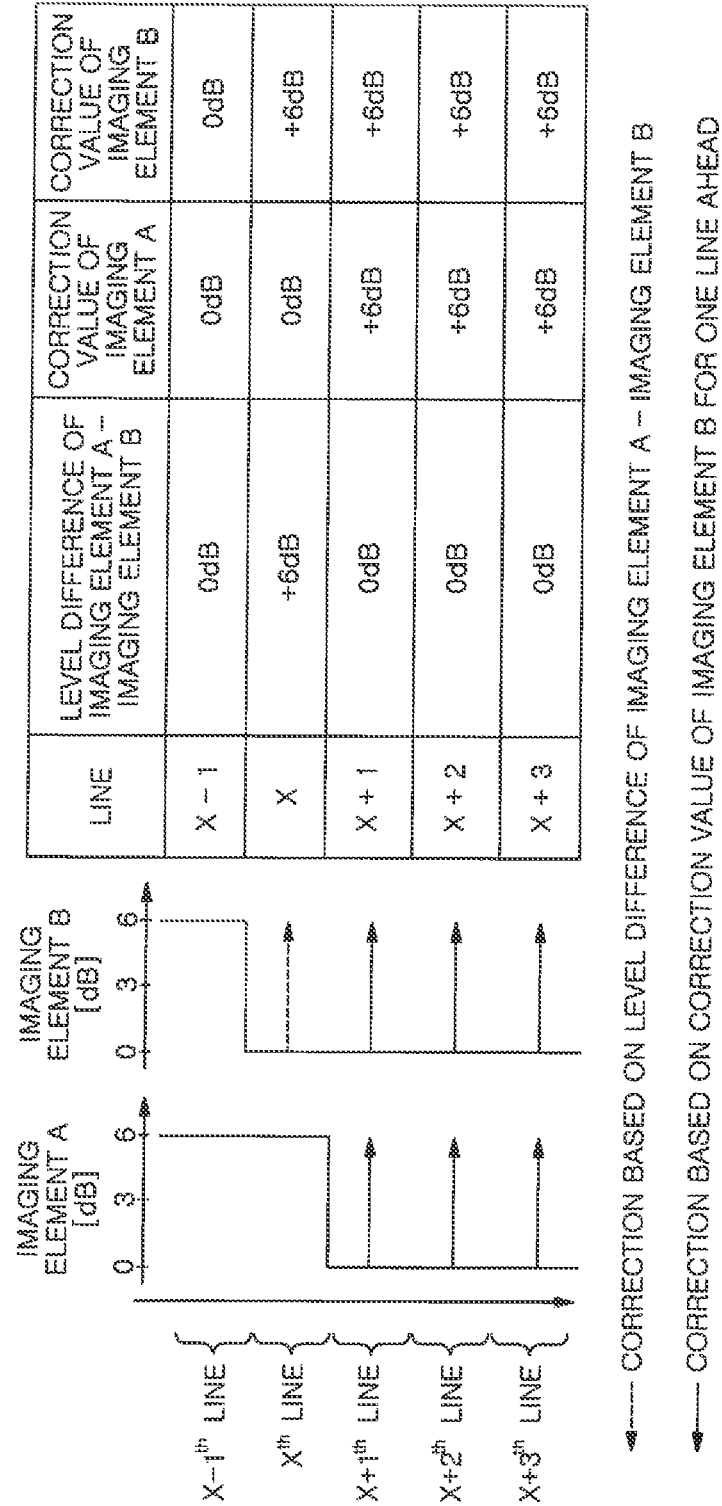
FIG. 5 is a diagram illustrating detection and correction of a flash band.

FIG. 5 is a diagram illustrating detection and correction of a flash band in the third frame shown in FIG. 3.

In FIG. 5, a flash is emitted at a timing after the imaging element A has completed charge reset of the $X^{th}$ line and started charge accumulation of the $X^{th}$ line and before the imaging element B starts charge accumulation of the $X^{th}$ line.

In this case, the $X^{th}$ line of the imaging element A has just started charge accumulation, and thus a flash band occurs. Meanwhile, since it is before the $X^{th}$ line of the imaging element B starts charge accumulation, no flash band occurs.

The comparison unit 42 detects a level difference in the $X^{th}$ line by comparing image signals a and b, of which image phases are synchronized by the signal delay unit 41, and outputs the level difference to the correction unit 43.

The correction unit 43 determines that a line at which a signal level of the imaging element A starting exposure earlier is higher than a signal level of the imaging element B starting exposure later, such as the $X^{th}$ line shown in FIG. 5, is an end line of the flash band.

When a level difference is not significant (a level difference having an absolute value of less than the threshold value or the like), the correction unit 43 replaces the level difference with 0 dB to prevent a miscorrection.

The correction unit 43 adds the level difference value and a correction value gb of the imaging element B for one line ahead and determines that the result value is a correction value gb for a current line of the imaging element B.

For example, at the $X^{th}$ line shown in FIG. 5, a correction value gb of 0 dB for an $(X-1)^{th}$ line of the imaging element B is added to a level difference of +6 dB such that a correction value gb for the $X^{th}$ line becomes +6 dB.

At the $(X+1)^{th}$ line and the subsequent lines shown in FIG. 5, a correction value gb of +6 dB for one line ahead is added to a level difference of 0 dB such that the correction value gb is maintained at +6 dB.

The correction unit 43 corrects a level of the image signal b for lines subsequent to the $X^{th}$ line with the correction value gb. Due to this level correction, the lower portion of the screen is corrected so that a signal level is adjusted according to the flash band in the upper portion of the screen of the imaging element B. As a result, the boundary of the flash band is blurred and becomes unnoticeable, and the entire screen is corrected to have a flash.

Further, the correction unit 43 determines that the correction value gb for one line ahead is a correction value ga of the imaging element A. The correction unit 43 corrects a level of the image signal a with the correction value ga. Due to this level correction, the boundary of the flash band which occurs to be shifted by one line in the image signal a of the imaging element A and in the lower portion of the screen is blurred and becomes unnoticeable, and the entire screen is corrected to have a flash. The correction removes inconvenience of the flash band while saving the fact that there has been a flash as an image.

<Detection and Correction of Flash Band Changed in Stages>

Detection and correction of a flash band which is changed in stages will be described with reference to FIGS. 6 and 7.

Figure 6:
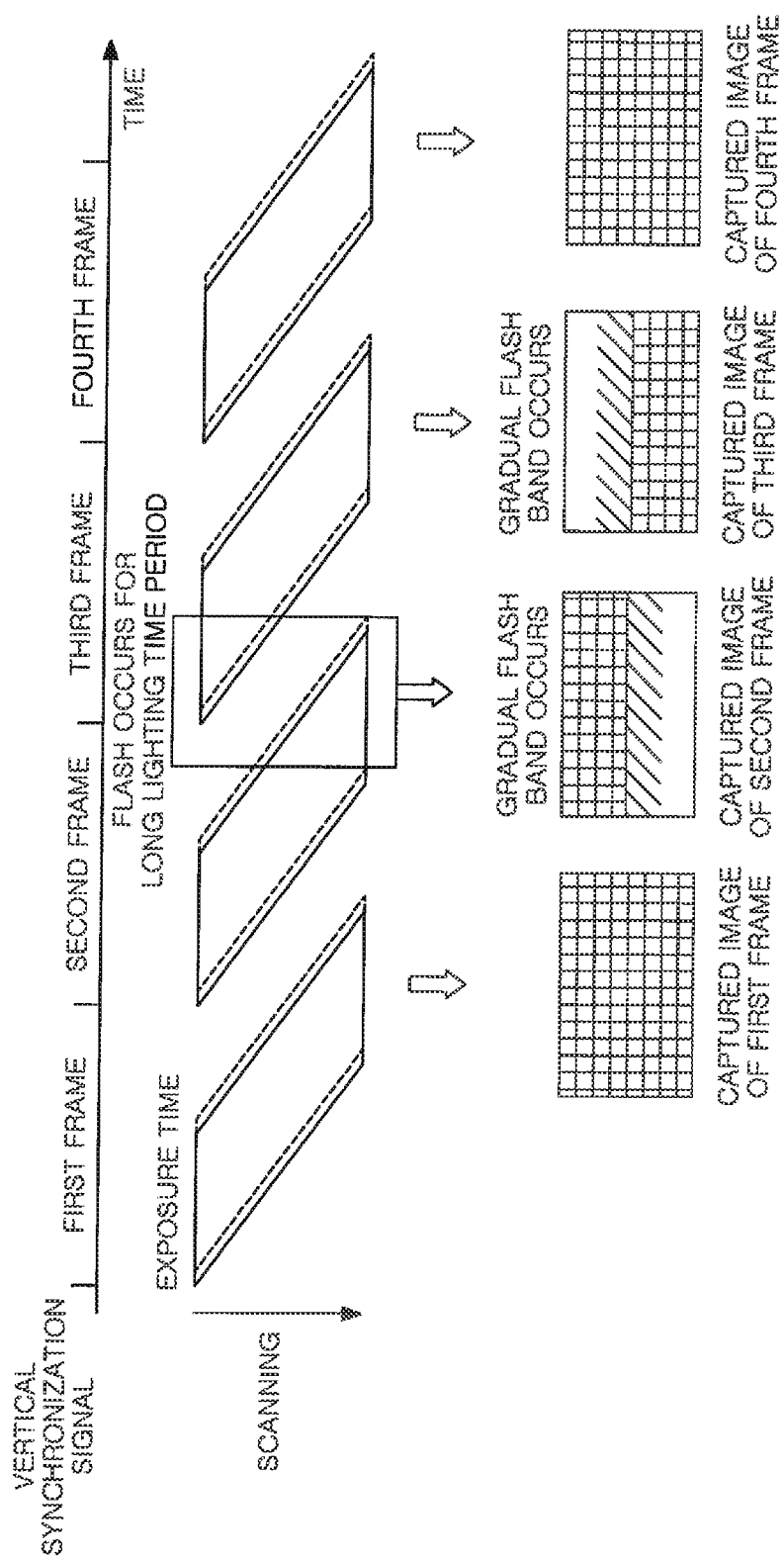
FIG. 6 is an explanatory diagram showing a rolling shutter operation along a time axis.

FIG. 6 is an explanatory diagram showing a rolling shutter operation along a time axis.

In FIG. 6, a flash occurs for a long lighting time period. Such a flash occurs in a case of flat peak (FP) lighting for high speed synchronization or when several flashes overlap. A slit range (see FIG. 2) moves over the long lighting time period such that brightness of a boundary area of the flash band varies in stages.

Figure 7:
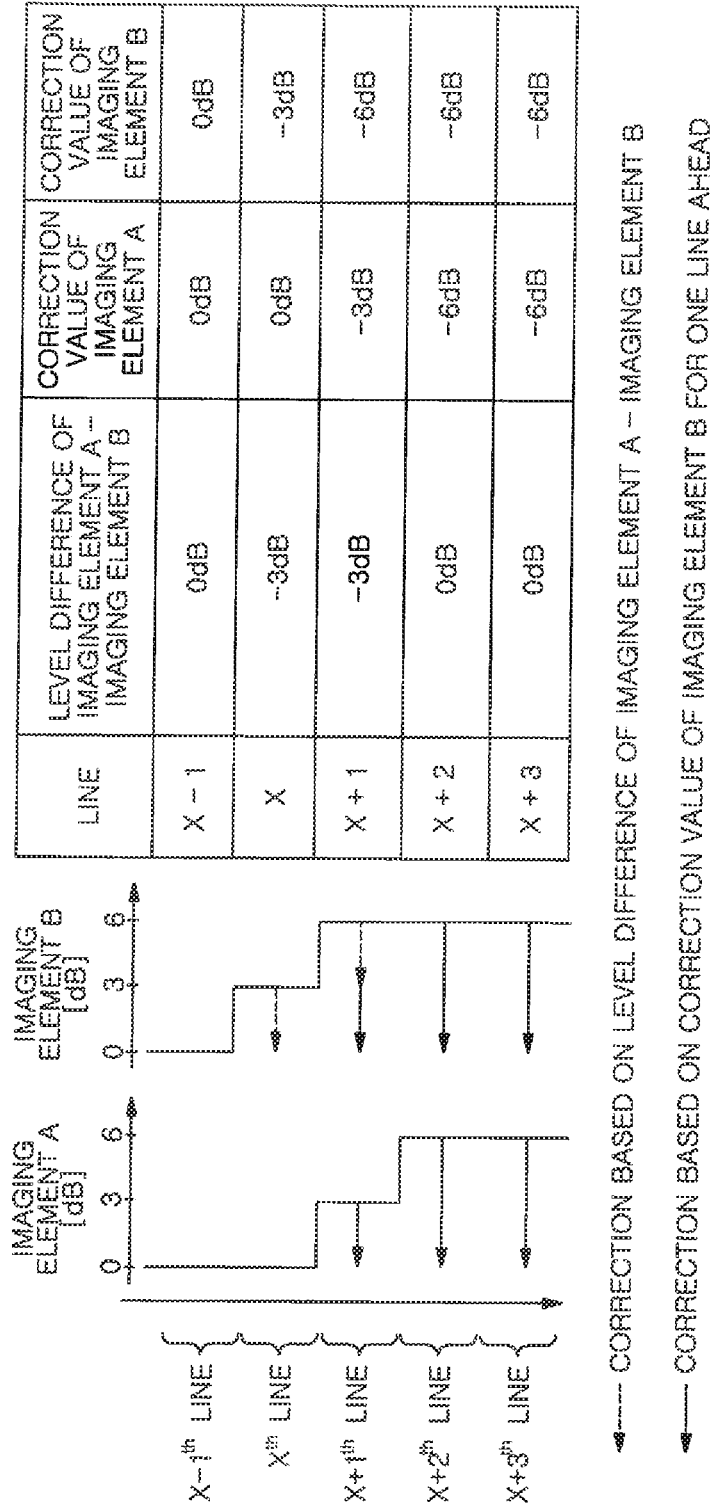
FIG. 7 is a diagram illustrating detection and correction of a flash band.

FIG. 7 is a diagram illustrating detection and correction of the flash band which varies in stages.

In FIG. 7, brightness of the flash band is increased in stages at the $X^{th}$ line and the $(X+1)^{th}$ line in the image signal b of the imaging element B.

The comparison unit 42 outputs a level difference starting at the $X^{th}$ line by comparing the image signals a and b, of which image phases are synchronized by the signal delay unit 41, and outputs the level difference to the correction unit 43.

The correction unit 43 determines that a line at which a signal level of the imaging element A starting exposure earlier is lower than a signal level of the imaging element B starting exposure later, such as the $X^{th}$ line shown in FIG. 7, is a start line of the flash band.

When a level difference is not significant (a level difference having an absolute value of less than the threshold value or the like), the correction unit 43 replaces the level difference with 0 dB to prevent a miscorrection.

The correction unit 43 adds the level difference value and a correction value gb of the imaging element B for one line ahead and determines that the result value is a correction value gb for a current line of the imaging element B.

For example, at the $X^{th}$ line shown in FIG. 7, a correction value gb of 0 dB for an $(X-1)^{th}$ line of the imaging element B is added to a level difference of −3 dB such that a correction value gb for the $X^{th}$ line becomes −3 dB.

At the $(X+1)^{th}$ line shown in FIG. 7, a correction value gb of −3 dB for the $X^{th}$ line of the imaging element B is added to a level difference of −3 dB such that a correction value gb for the $X^{th}$ line becomes −6 dB.

At an $(X+2)^{th}$ line and the subsequent line of the imaging element B shown in FIG. 7, a correction value gb of −6 dB for one line ahead is added to a level difference of 0 dB such that the correction value gb is maintained at −6 dB.

The correction unit 43 corrects a level of the image signal b with the calculated correction value gb. Due to this level correction, the flash band which occurs in the image signal b of the imaging element B and in the lower portion of the screen is corrected to be darker and thus becomes unnoticeable.

Further, the correction unit 43 determines that the correction value gb for one line ahead is a correction value ga of the imaging element A. The correction unit 43 corrects a level of the image signal a with the correction value ga. Due to this level correction, the flash band which occurs to be shifted by one line in the image signal a of the imaging element A and in the lower portion of the screen is corrected to be darker and becomes unnoticeable.

<Detection and Correction of Flash Band in Frame>

Detection and correction of a flash band which occurs in a frame will be described with reference to FIGS. 8 and 9.

Figure 8:
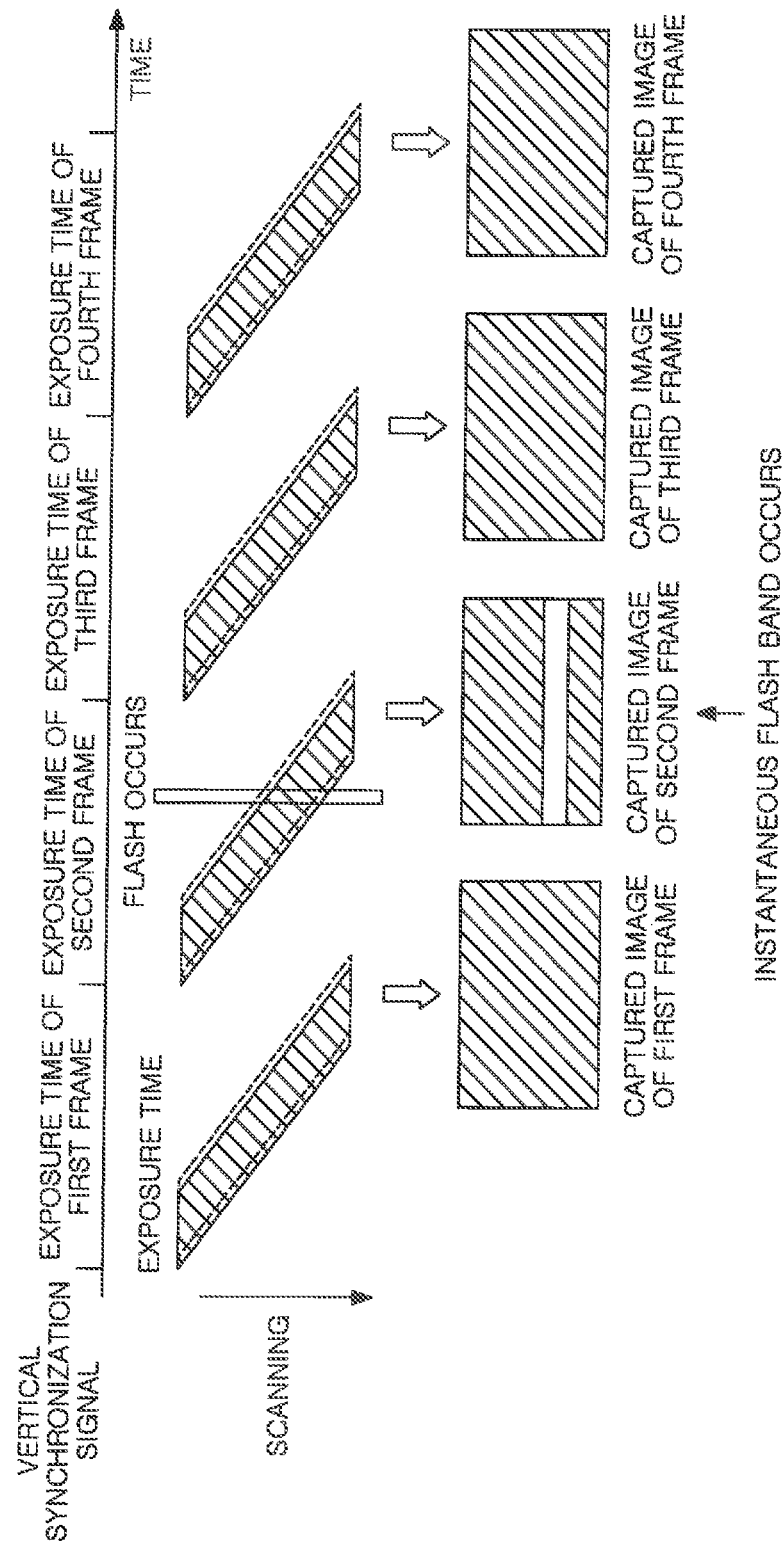
FIG. 8 is an explanatory diagram showing a rolling shutter operation along a time axis.

FIG. 8 is an explanatory diagram showing a rolling shutter operation along a time axis.

In FIG. 8, an exposure time of a rolling shutter is set to be short. Accordingly, the width of a slit range (see FIG. 2) is short. When a flash goes off in this situation, a flash band having a narrow width occurs.

Figure 9:
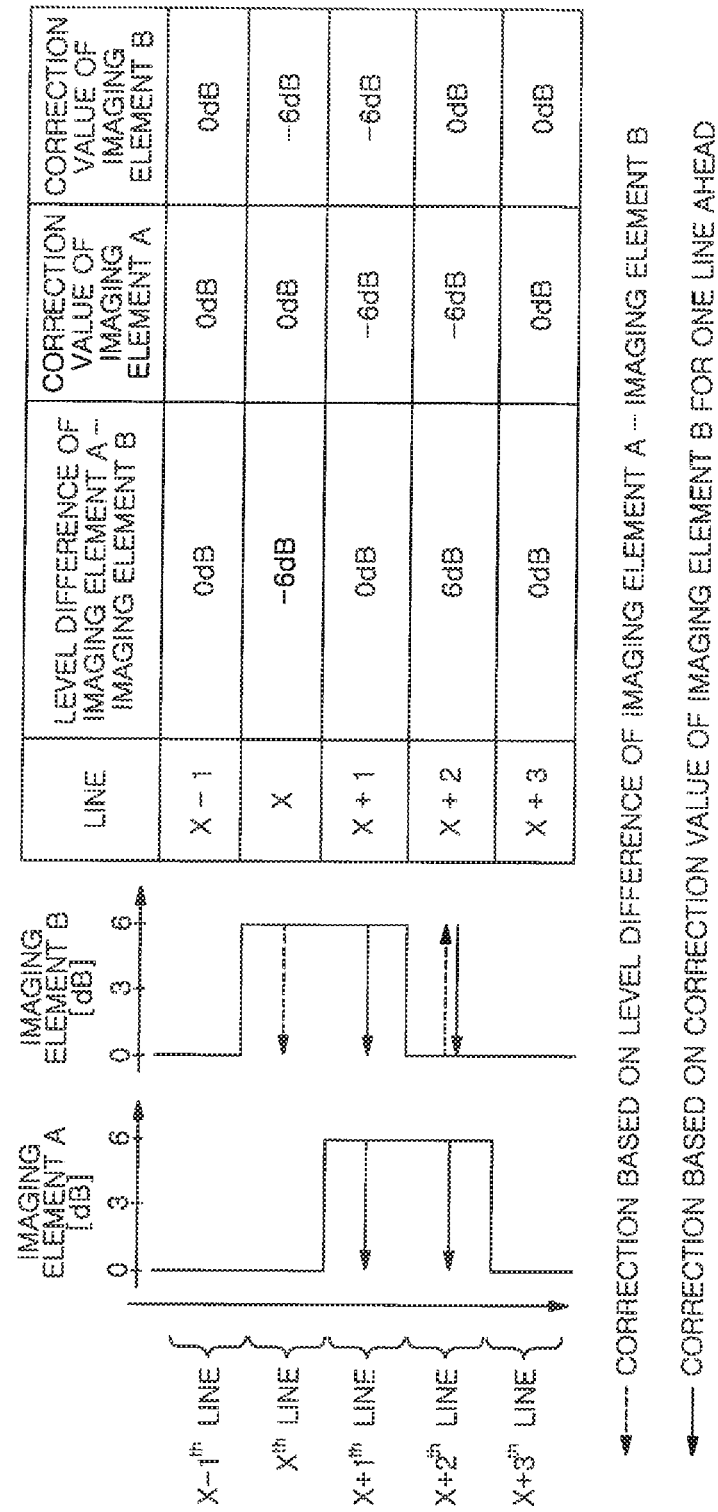
FIG. 9 is a diagram illustrating detection and correction of a flash band.

FIG. 9 is a diagram illustrating detection and correction of the flash band.

In FIG. 9, a flash band having a width of two lines from the $X^{th}$ line to the $(X+1)^{th}$ line occurs in the image signal b of the imaging element B. Meanwhile, a flash band having a width of two lines from the $(X+1)^{th}$ line to the $(X+2)^{th}$ line occurs in the image signal a of the imaging element A.

The comparison unit 42 compares the image signals a and b of which image phases are synchronized by the signal delay unit 41 and outputs a level difference beginning at the $X^{th}$ line to the correction unit 43.

The correction unit 43 determines that a line at which a signal level of the imaging element A starting exposure earlier is lower than a signal level of the imaging element B starting exposure later, such as the $X^{th}$ line shown in FIG. 9, is a start line of the flash band.

Further, the correction unit 43 determines that a line at which a signal level of the imaging element A starting exposure earlier is higher than a signal level of the imaging element B starting exposure later, such as the $(X+2)^{th}$ line shown in FIG. 9, is an end line of the flash band.

When a level difference is not significant (a level difference having an absolute value of less than the threshold value or the like), the correction unit 43 replaces the level difference with 0 dB to prevent a miscorrection.

The correction unit 43 adds the level difference value and a correction value gb of the imaging element B for one line ahead and determines that the result value is a correction value gb for a current line of the imaging element B.

For example, at the $X^{th}$ line shown in FIG. 9, a correction value gb of 0 dB for the $(X-1)^{th}$ line of the imaging element B is added to a level difference of −6 dB such that a correction value gb for the $X^{th}$ line becomes −6 dB.

At the $(X+1)^{th}$ line shown in FIG. 9, a correction value gb of −6 dB for the $X^{th}$ line of the imaging element B is added to a level difference of 0 dB such that a correction value gb for the $(X+1)^{th}$ line becomes −6 dB.

At the $(X+2)^{th}$ line shown in FIG. 9, a correction value gb of −6 dB for the $(X+1)^{th}$ line of the imaging element B is added to a level difference of +6 dB such that a correction value gb for the $(X+2)^{th}$ line becomes −6 dB.

The correction unit 43 corrects a level of the image signal b with the calculated correction value gb. Due to this level correction, the narrow flash band occurring in the image signal b of the imaging element B is corrected to be darker and thus becomes unnoticeable.

Further, the correction unit 43 determines that the correction value gb for one line ahead is a correction value ga of the imaging element A. The correction unit 43 corrects a level of the image signal a with the correction value ga. Due to this level correction, the narrow flash band which occurs to be shifted by one line in the image signal a of the imaging element A is corrected to be darker and becomes unnoticeable.

<Effects of the First Embodiment>

(1) In the first embodiment, lines of a subject which may be considered as being of the same portion and at the same time are compared between the image signals a and b of the imaging elements A and B. It is possible to accurately detect the occurrence of a flash band on the basis of the comparison result.

(2) According to the conventional case of Patent Document 1, a luminance difference between adjacent lines in one frame is calculated, and it is determined that a flash band has occurred when the difference is a predetermined value or more. In this case, when a scene, in which adjacent lines have a brightness difference, is captured, a flash band is misdetected.

Meanwhile, in the first embodiment, lines of a subject which may be considered as being of the same portion are compared between the image signals a and b of the imaging elements A and B, and thus the comparison is almost not affected by a scene of the subject (a scene having a brightness difference). Accordingly, there are few misdetections of a flash band.

(3) Further, according to the conventional case of Patent Document 2, a luminance difference between adjacent frames is calculated, and it is determined that a flash band has occurred when the difference is a predetermined value or more. In this case, when brightness changes occur over time, such as moving from a dark room to the bright outdoors, a flash band is misdetected.

Meanwhile, in the first embodiment, lines of a subject which may be considered as being at the same time are compared between the image signals a and b of the imaging elements A and B, and thus the comparison is almost not affected by a change in brightness of the subject over time. Accordingly, there are few misdetections of a flash band.

(4) Particularly in the first embodiment, lines of a subject which may be considered as being of the same portion and at the same time are compared between the image signals a and b of the imaging elements A and B. This comparision makes it possible to obtain a level difference in units of lines, which is caused by a flash band, with high precision. Accordingly, the flash band can be corrected with high precision.

(5) In the first embodiment, lines of a subject which may be considered as being of the same portion and at the same time are compared, and thus it is possible not to miss but to detect a small level difference. Accordingly, even a flash band of which a level is gradually changed can be appropriately detected and corrected.

(6) In the first embodiment, since lines of a subject which may be considered as being of the same portion and at the same time are compared, it is possible not to miss but to detect a flash band of which a level is complexly changed because a plurality of flashes overlap. Accordingly, it is possible to detect and correct a flash band of which a level is complexly changed.

(7) In the first embodiment, correction is performed within a frame. Accordingly, even when a flash band consecutively occurs over some frames, it is unnecessary to replace the frames unlike the conventional case of Patent Document 3, and there is not a problem of a video halting over several frames and the like.

(8) In the first embodiment, correction values ga and gb for the $X^{th}$ line of the imaging elements A and B may be determined by the following recurrence relation algorithm according to a simple calculation.

Correction value ga for $X^{th}$ line of imaging element A (X)=correction value gb for $(X-1)^{th}$ line of imaging element B (X-1)  Equation 1

Correction value gb for $X^{th}$ line of imaging element B (X)=correction value obtained by adding "correction value gb for $(X-1)^{th}$ line of imaging element B (X-1)" and "level difference at $X^{th}$ line between imaging elements A and B"  Equation 2

(9) There is not a correction value gb (0) for one line ahead of a first line of the imaging element B. For this reason, an initial value of the recurrence relation algorithm substantially becomes a correction value ga (1) for a first line of the imaging element A on the basis of equation 1.

Assuming that the correction value ga (1) is an initial value of 0 dB, the first line of the imaging element A is not corrected at all times.

Subsequently, equation 2 and equation 1 of the algorithm are repeated, and thus the correction values ga and gb of the imaging elements A and B are sequentially determined to remove a signal difference with the first line of the imaging element A. This means that the first line of the imaging element A becomes a reference for a signal level of a corresponding frame.

For this reason, when a flash band appears at a lower portion of a screen of a first frame and disappears at an upper portion of a screen of a second frame, an entire screen of the first frame in a corrected video is less affected by a flash, and an entire screen of the second frame in the corrected video is affected by the flash.

In particular, when the second frame is corrected in this way, it is possible to obtain a natural flash video like in global shutter photography while showing that a flash has instantaneously gone off.

(10) In the first embodiment, as an initial value of the recurrence relation algorithm, the correction value gb (0) for one line ahead of the first line of the imaging element B may be determined to be a correction value for a last line of one frame ahead of the imaging element B.

In this case, correction of a flashband continues from a previous frame to the subsequent frame. For this reason, when a flash band appears at a lower portion of a screen of a first frame and disappears at an upper portion of a screen of a second frame, the flash band is removed from entire screens of both the first frame and second frame in a corrected video.

With this correction, it is possible to obtain a natural video as if no flash had gone off.

(11) In the first embodiment, when a level difference is smaller than the threshold value, the level difference is replaced with 0 dB. For this reason, when a level difference of one line is only an error, there is little worry that a subsequent line will be affected by a correction value corresponding to the error.

(12) In the first embodiment, a level difference in each line between the imaging elements A and B can be calculated according to each of color mosaic components (e.g., RGB color components of the Bayer arrangement). When a level difference according to each of the color components is input to the recurrence relation algorithm, a correction value for reducing the influence of a flash band can be calculated according to each of the color components. As a result, it is possible to reduce the influence of even a colored flash band.

(13) In particular, in the first embodiment, exposure start timings are made different to shift a slit range. For this reason, even in a conventional multi-plate imaging device, exposure start timings are made different according to firmware (a program) such that a slit range can be shifted and a flash band detection and correction function can be performed later.

For example, when the drive unit 3, the image signal processing unit 4, and the CPU unit 7 are controlled with firmware (a program), it is possible to perform the flash band detection and correction function.

Second Embodiment

Detection and correction of a flash band with a spatial line shift between imaging elements will be described with reference to a second embodiment.

Figure 10:
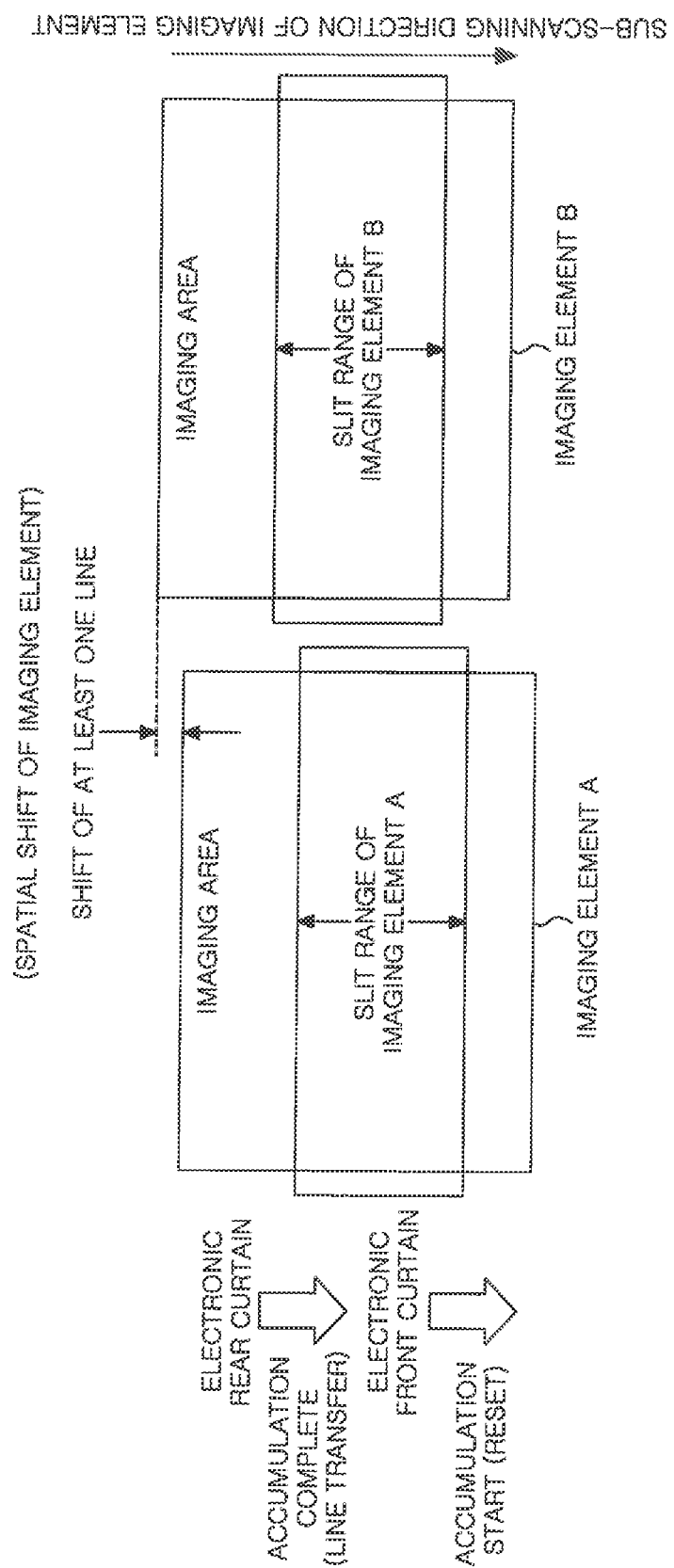
FIG. 10 is a diagram illustrating a spatial line shift between imaging elements.

FIG. 10 is a diagram illustrating a spatial line shift between imaging elements A and B.

In FIG. 10, positions of imaging areas of the imaging elements A and B are determined by shifting the imaging area by at least one line in a sub-scanning direction. The imaging elements A and B perform a rolling shutter operation with exposure start timings thereof synchronized. As a result, slit ranges of the imaging elements A and B reflect the spatial shift and thus have a shift of at least one line in the sub-scanning direction.

Since it is not possible to detect a flash band in an imaging area from which the imaging elements A and B are moved, the imaging area may be excluded from a valid imaging area.

Due to the spatial shift between the imaging areas of the imaging elements A and B, an image of a subject is shifted by at least one line. Accordingly, an image signal of an imaging element of which a slit range passes the subject image first is delayed to synchronize phases of images output by the imaging elements A and B.

Other configurations, operations, and effects overlap those of the first embodiment, and thus descriptions thereof are omitted.

Third Embodiment

A dual-green multi-plate imaging device will be described as a third embodiment.

Figure 11:
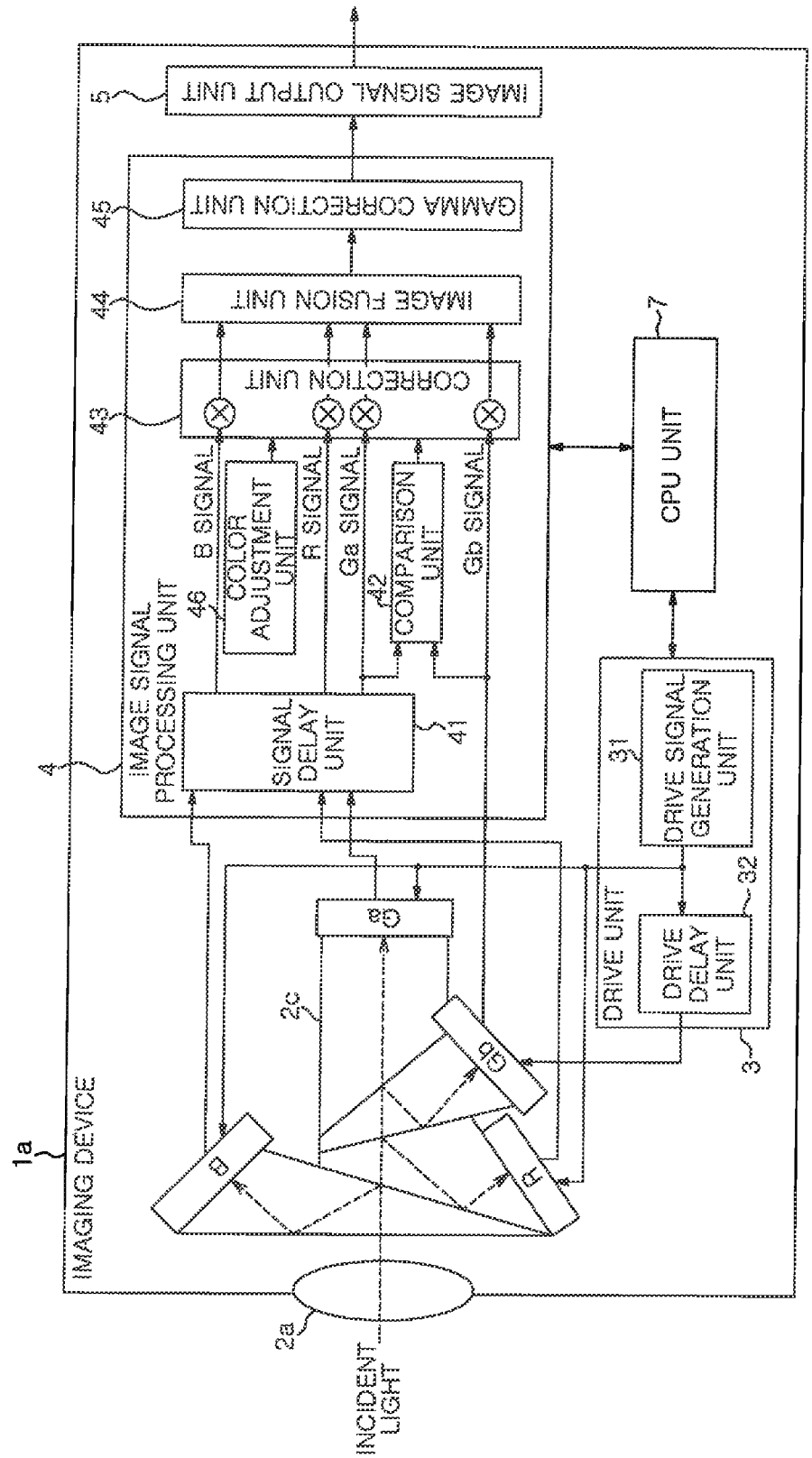
FIG. 11 is a block diagram showing an example of a configuration of a third embodiment.

FIG. 11 is a block diagram showing an example of a configuration of an imaging device 1a.

In FIG. 11, a color-separating dispersion prism 2c of the imaging device 1a disperses a bundle of imaging rays into red rays, blue rays, and green rays and disperses the green rays again into two types of green rays. Subject images of the dispersed color components are converted into image signals of the color components by an imaging element R, an imaging element B, and imaging element Ga, and an imaging element Gb. These multi-plate imaging elements are black-and-white imaging elements showing the same performance using a rolling shutter method and disposed at positions determined in the same pixel space.

A drive signal generation unit 31 of a drive unit 3 supplies drive signals to the imaging element Ga, the imaging element R, and the imaging element B at the same timing. Meanwhile, a drive signal delayed for a predetermined time by a drive delay unit 32 is supplied to the imaging element Gb. As a result, an exposure start timing of the imaging element Gb is delayed by the predetermined time in comparison with the imaging element Ga.

A signal delay unit 41 of an image signal processing unit 4 synchronizes image signals of the imaging element R, the imaging element B, and the imaging element Ga with an image signal of the imaging element Gb by delaying the image signals.

Subsequently, a comparison unit 42 calculates a level difference in units of lines by comparing signal levels of the image signals of the imaging element Ga and the imaging element Gb.

A correction unit 43 executes a recurrence relation algorithm, which will be described below, on the basis of the line-specific level differences and a color adjustment unit 46 and performs level correction on the image signals of the imaging element R, the imaging element B, the imaging element Ga, and the imaging element Gb to reduce the influence of a flash band.

Image signals of color components after the level correction are fused into one color image signal by an image fusion unit 44. Then, the color image signal is subjected to image processing, such as gamma correction, by a gamma correction unit 45 and externally output through an image signal output unit 5.

A CPU unit 7 controls the drive unit 3, the image signal processing unit 4, or the like.

<Operation of the Third Embodiment>

An operation of detecting and correcting a flash band in image signals of the imaging element Ga and the imaging element Gb is the same as the detection and correction operation of the imaging element A and the imaging element B described in the first embodiment, and thus a description of overlapping content is omitted.

Meanwhile, the imaging element A and the imaging element B perform imaging at the same timing as the imaging element Ga. For this reason, when a flash goes off, images of the imaging element A and the imaging element B are affected by the flash like an image of the imaging element Ga. Accordingly, like the image of the imaging element A, the images of the imaging element A and the imaging element B may be corrected using a correction value for one line ahead of the imaging element Gb.

However, the correction value is a correction value of green light calculated from a difference between signal levels of the imaging element Ga and the imaging element Gb. For this reason, the color adjustment unit 46 sets a correction coefficient for a ratio of red light to green light and a correction coefficient for a ratio of blue light to green light in advance. The correction unit 43 corrects images of the imaging element R and the imaging element B with a correction value obtained by multiplying the correction coefficients.

The red light correction coefficient and the blue light correction coefficient set in the color adjustment unit 46 are in accordance with a preset color balance of flash light and may be adjusted and set to an arbitrary value by a user. Further, when necessary, the red light correction coefficient and the blue light correction coefficient may be automatically calculated from a color balance of an image affected by a flash.

When the calculation of the correction value is arranged by a recurrence relation algorithm, a correction value for a signal level of an $X^{th}$ line of each imaging element is as follows:

Correction value (dB) for $X^{th}$ line of imaging element Ga=(correction value for $(X-1)^{th}$ line of imaging element Gb)

Correction value (dB) for $X^{th}$ line of imaging element Gb=(correction value for $(X-1)^{th}$ line of imaging element Gb)+{(signal level of $X^{th}$ line of imaging element Ga)−(signal level of $X^{th}$ line of imaging element Gb)}

Correction value (dB) for $X^{th}$ line of imaging element R=(correction value for $(X-1)^{th}$ line of imaging element Gb))+(correction coefficient of red light with respect to green light)

Correction value (dB) for $X^{th}$ line of imaging element B=(correction value for $(X-1)^{th}$ line of imaging element Gb))+(correction coefficient of blue light with respect to green light).

<Effects of the Third Embodiment>

In addition to the effects of the first and the second embodiment, the third embodiment has the following effects.

(1) In the second embodiment, a correction value for a flash band is calculated on the basis of dual-green multi-plate green light image signals. Since humans have high visual sensitivity to green light, green light is a color component of which a flash band is noticeable. It is possible to make a flash band unnoticeable by detecting and correcting the flash band on the basis of the green image signals.

(2) In the second embodiment, image signals of red light and blue light are corrected using correction values obtained by tonally correcting a correction value of green light. Accordingly, the image signals can be corrected for good color reproducibility, and thus it is possible to appropriately make a flash band unnoticeable.

Fourth Embodiment

A case of shifting a phase of a pixel arrangement will be described as a fourth embodiment.

In the case of the imaging device 1 (FIG. 1) of the first and the second embodiment, the imaging elements A and B shift a phase in horizontal and vertical directions (e.g., ½ pixel pitch) on the basis of an image position of each subject image dispersed by the dispersion prism 2b such that the position is determined.

In the case of the imaging device 1a (FIG. 11) of the third embodiment, the imaging elements Ga and Gb shift a phase in horizontal and vertical directions (e.g., ½ pixel pitch) on the basis of an image position of each subject image of green light dispersed by the color-separating dispersion prism 2c such that the position is determined.

The image fusion unit 44 calculates high frequency components of horizontal and vertical directions on the basis of an image signal spatially sampled by shifting a phase of a pixel arrangement and thereby improves a resolution.

A method of detecting and correcting a flash band in the fourth embodiment is the same as described in the first to third embodiments.

However, a very small difference (a high frequency component) between scenes of a subject compared in units of lines by the comparison unit 42 may occur due to the phase shift of the pixel arrangement. Accordingly, it is preferable to reduce the very small difference (the high frequency component) between the scenes using a low pass filter or an average filter before or after the scenes are compared by the comparison unit 42.

<Effects of the Fourth Embodiment>

In addition to the effects of the first to third embodiments, the fourth embodiment has the following effect.

It is possible to obtain an image with excellent resolution while appropriately removing a flash band.

<Supplements to Embodiments>

(1) In the above-described embodiments, a case of shifting a slit range, which is between a front curtain and a rear curtain of the rolling shutter method, by one line in a sub-scanning direction between a plurality of imaging elements for scanning has been described.

However, the present invention is not limited thereto. The slit range may be shifted by a plurality of, that is, n, lines or more in the sub-scanning direction for scanning. In this case, line-specific level differences caused by a flash belt consecutively occur over n lines in a frame.

Since level differences which have a wide width corresponding to n lines as described above occur, it is possible to increase the precision in detecting a flash belt.

Further, it is possible to suppress noise included in level differences which have the wide width corresponding to n lines and increase a signal-to-noise (S/N) ratio of the level differences by averaging the level differences. As a result, the level differences can be accurately calculated, and thus a flash belt can be corrected with high precision.

Further, level differences which have the wide width corresponding to n lines are relatively less affected by a phase shift (½ pixel pitch or the like) of a pixel arrangement and thus are suitable for combination with the fourth embodiment.

(2) In the embodiments, the correction unit 43 corrects an image signal through gain correction (dB). In general, when a flash goes off, the amount of incident light equals (reflectance of subject)×(amount of flash light and amount of surrounding light). For this reason, it is possible to reduce the influence of the amount of flash light by multiplying (gain correction) an image signal of a flash band by the amount of surrounding light/(the amount of flash light and the amount of surrounding light). Further, the gain correction may be performed on an image signal which may be considered as a linear shape before the gamma correction.

However, the present invention is not limited thereto. For example, when a flash goes off in the lens angle of view of an imaging device, the amount of incident light equals the amount of (subject light+flash light). Further, when a flash goes off just outside the lens angle of view of an imaging device, the amount of incident light equals the amount of (subject light+lens flare light caused by the flash). In this case, the correction unit 33 can subtract (offset correction or black level correction) a level difference from a flash band area of an image signal.

(3) In the embodiments, an imaging device detects and corrects a flash band. However, the present invention is not limited thereto. Some or all of the above-described functions of the comparison unit 42, the correction unit 43, the signal delay unit 41, and the color adjustment unit 46 can be performed by a program in a computer, an external computer, or a server computer in a network which is accompanied by an imaging device.

Although the present invention has been described in detail above on the basis of appropriate embodiments thereof, the present invention is not limited to the specific embodiments, and some of the above-described embodiments may be suitably combined.

INDUSTRIAL APPLICABILITY

The present invention can be used in imaging devices for business, imaging devices such as broadcast cameras, image processing methods of imaging devices, programs used in imaging devices, and the like. This application claims priority to and the benefit of Japanese Patent Application No. 2018-174131, filed on Sep. 18, 2018, the disclosure of which is incorporated herein by reference in its entirety.

EXPLANATION OF REFERENCE NUMERALS a, b: image signal
A, B: imaging element
1: imaging device
1a: imaging device
2a: lens
2b: dispersion prism
2c: color-separating dispersion prism
3: drive unit
4: image signal processing unit
5: image signal output unit
7: CPU unit
31: drive signal generation unit
32: drive delay unit
41: signal delay unit
42: comparison unit
43: correction unit
44: image fusion unit 45: gamma correction unit
46: color adjustment unit

What is claimed is:

1. An imaging device comprising:
an optical system configured to disperse light of a subject image;
a plurality of imaging elements configured to capture subject images dispersed by the optical system using a rolling shutter method;
an imaging unit configured to shift a slit range, which is between a front curtain and a rear curtain of the rolling shutter method, by at least one line in a sub-scanning direction between the plurality of imaging elements;
a comparison unit configured to calculate a level difference in units of lines between image signals output by the plurality of imaging elements by comparing signal levels of the image signals; and
a correction unit configured to correct influence of a flash band on the image signals on the basis of the level difference.

2. The imaging device of claim 1, wherein the imaging unit alters exposure start timings of the plurality of imaging elements by a predetermined time.

3. The imaging device of claim 1, wherein the plurality of imaging elements are disposed such that imaging areas of the plurality of imaging elements are shifted at least one line in the sub-scanning direction on the basis of an image position of each of the dispersed subject images.

4. The imaging device of claim 1, further comprising a signal delay unit configured to reduce a line shift between images output by the plurality of imaging elements by delaying the image signal of the imaging element of which the slit range passes each of the subject images first, wherein the comparison unit calculates the level difference in each line between the image signals by comparing the plurality of images signals through the signal delay unit.

5. The imaging device of claim 1, wherein the comparison unit calculates the level difference in units of lines between a signal level (La) of the imaging element (A) of which the slit ranges passes each of the subject images first and a signal level (Lb) of the imaging element (B) of which the slit range passes each of the subject images later, and the correction unit determines that a value obtained by adding the level difference and a correction value (gb) of the imaging element (B) for one line ahead is a correction value (gb) of the imaging element (B), corrects the image signal of the imaging element (B) in units of lines, determines that a correction gain (Gb) for one line ahead is a correction value (ga) of the imaging element (A), and corrects the image signal of the imaging element (A) in units of lines.

6. The imaging device of claim 1, wherein the plurality of imaging elements are disposed such that phases of pixel arrangements of the plurality of imaging elements are shifted on the basis of an image position of each of the dispersed subject images.

7. The imaging device of claim 1, wherein the optical system disperses the subject image into a red component, a blue component, and two green components,
the imaging unit shifts the slit range by a predetermined number of lines in the sub-scanning direction between the two imaging elements, which separately receive light of the two green components, and performs scanning,
the comparison unit calculates the level difference in each line between the image signals by comparing signal levels of image signals of the two green components, and
the correction unit corrects the green component of the flash band according to the level difference between the two green components, corrects the red component of the flash band according to a level difference obtained by color-adjusting the level difference with the red component, and corrects the blue component of the flash band according to a level difference obtained by color-adjusting the level difference with the blue component.

8. A method of processing an image signal in an imaging device which includes an optical system configured to disperse light of a subject image, a plurality of imaging elements configured to capture subject images dispersed by the optical system using a rolling shutter method, and an imaging unit configured to shift a slit range, which is between a front curtain and a rear curtain of the rolling shutter method, by at least one line in a sub-scanning direction between the plurality of imaging elements, the method comprising:
a comparison step of calculating a level difference in each line between image signals output by the plurality of imaging elements by comparing signal levels of the image signals; and
a correction step of correcting influence of a flash band on the image signals on the basis of the level difference.

* * * * *